US010507804B1

(12) United States Patent
Chandler et al.

(10) Patent No.: US 10,507,804 B1
(45) Date of Patent: Dec. 17, 2019

(54) AXLE SAVER LANDFILL COMPACTOR CLEANER FINGER

(71) Applicant: Caterpillar Global Mining Equipment LLC, Denison, TX (US)

(72) Inventors: Brian J. Chandler, St. Charles, IL (US); Marcus John Guethle, Owego, IL (US); Yingzhou Liu, Naperville, IL (US); Bradley J. Miller, Spring Valley, IL (US); Mindong Pi, Naperville, IL (US); Jonathan Jennings, Montgomery, IL (US); Amit Kashyap, Elgin, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 16/045,032

(22) Filed: Jul. 25, 2018

(51) Int. Cl.
*B60S 1/68* (2006.01)
*E02D 3/026* (2006.01)

(52) U.S. Cl.
CPC .............. *B60S 1/68* (2013.01); *E02D 3/0265* (2013.01)

(58) Field of Classification Search
CPC ....................................................... B60S 1/68
See application file for complete search history.

(56) References Cited

U.S. PATENT DOCUMENTS

| 712,509 | A | * | 11/1902 | Dennis | B60B 15/02 280/855 |
| 1,060,141 | A | * | 4/1913 | Snyder | B23B 31/113 172/753 |
| 1,406,809 | A | * | 2/1922 | Arnold | B60S 1/68 280/855 |
| 1,755,438 | A | * | 4/1930 | Ferguson | E02F 9/2808 37/452 |
| 1,771,642 | A | * | 7/1930 | Larson | B60S 1/68 280/855 |
| 1,790,006 | A | * | 1/1931 | Garrett | B60S 1/68 280/855 |
| 1,808,639 | A | * | 6/1931 | Detamore | B60S 1/68 280/855 |
| 1,828,824 | A | * | 10/1931 | Von Brethorst | B60S 1/68 280/855 |

(Continued)

FOREIGN PATENT DOCUMENTS

EP    2009180 A1    12/2008

*Primary Examiner* — Erez Gurari
(74) *Attorney, Agent, or Firm* — Miller, Matthias & Hull

(57) ABSTRACT

A cleaner finger assembly for cleaning compactor teeth on a compactor wheel of a compactor machine includes a cleaner finger base having a tip engaging surface and a base longitudinal axis, a cleaner finger tip having a base engaging surface and a tip longitudinal axis, and a finger tip anchoring mechanism attaching the cleaner finger tip to the cleaner finger base with the base engaging surface facing and engaging the tip engaging surface. The finger tip anchoring mechanism fails and the cleaner finger tip detaches when the cleaner finger tip is engaged by debris with a force parallel to the tip longitudinal axis, or with a force perpendicular to the tip longitudinal axis, to cause a tip shear force greater than a tip anchor shear capacity of the finger tip anchoring mechanism or a tension force greater than a tip anchor tension capacity of the finger tip anchoring mechanism.

17 Claims, 4 Drawing Sheets

(56) References Cited

U.S. PATENT DOCUMENTS

| | | | | |
|---|---|---|---|---|
| 1,872,120 A * | 8/1932 | Caskey | B60S 1/68 | 280/855 |
| 1,875,252 A * | 8/1932 | Meyer | B60S 1/68 | 24/69 TT |
| 1,877,005 A * | 9/1932 | Merklin | B60S 1/68 | 15/246 |
| 1,882,244 A * | 10/1932 | De Nooy | B60S 1/68 | 280/855 |
| 1,933,679 A * | 11/1933 | Nicewander | B60S 1/68 | 172/610 |
| 1,942,655 A * | 1/1934 | McCormick | B60S 1/68 | 280/855 |
| 2,582,199 A * | 1/1952 | Gardner | E01C 19/236 | 172/547 |
| 2,937,883 A * | 5/1960 | Alcoriza | B60S 1/68 | 280/855 |
| 3,085,484 A * | 4/1963 | McAdams | E02D 3/026 | 280/855 |
| 3,259,036 A * | 7/1966 | Peterson | E02D 3/026 | 280/855 |
| 3,464,714 A * | 9/1969 | Prillinger | B60S 1/68 | 280/855 |
| 3,554,101 A * | 1/1971 | Grant | E02D 3/026 | 404/121 |
| 3,633,471 A * | 1/1972 | Randour | E02D 3/026 | 404/121 |
| 3,988,071 A * | 10/1976 | Cochran | E02D 3/026 | 404/129 |
| 4,200,156 A * | 4/1980 | van der Lely | A01B 29/045 | 172/49.5 |
| 5,360,288 A * | 11/1994 | O'Neill | A01B 29/06 | 37/452 |
| 5,661,959 A * | 9/1997 | Vargas | A01D 34/003 | 404/129 |
| 5,988,940 A * | 11/1999 | Johansson | E01C 19/238 | 15/256.51 |
| 7,066,682 B2 * | 6/2006 | Hester | E02D 3/026 | 404/124 |
| 7,163,354 B2 * | 1/2007 | Runestad | E02D 3/026 | 172/606 |
| 9,120,466 B2 * | 9/2015 | Lindemeier | B60S 1/68 | |
| 2005/0117971 A1 * | 6/2005 | Berg | E01C 19/238 | 404/129 |
| 2015/0110557 A1 * | 4/2015 | Dykhnich | E02D 3/026 | 404/121 |

\* cited by examiner

AXLE SAVER LANDFILL COMPACTOR CLEANER FINGER

TECHNICAL FIELD

The present disclosure relates generally to cleaner fingers for cleaning debris from between adjacent rows of compactor teeth on an outer surface of a compactor wheel and, more particularly, to cleaner fingers having multi-piece construction to fail in a manner that minimizes damage to components of a compactor machine.

BACKGROUND

Landfill compactor wheels include compactor teeth mounted on outer surfaces of the compactor wheels. The compactor teeth are circumferentially spaced about the outer surface of the compactor wheel and arranged in rows that are generally evenly spaced longitudinally across the outer surface. Various types of cleaner fingers or bars have been used in the past to clean debris from the areas on the compactor wheels between adjacent rows of compactor teeth. In most applications, the cleaner teeth or bars have a one-piece construction, are rectangular in shape and are oriented with respect to the compacting wheel in order to scrape the clogged debris from the area between the rows of compactor teeth. The cleaner fingers are generally designed to withstand loading typical of removing mud and small debris from the compactor wheels. However, the landfill compactor can encounter large debris in the landfill such as refrigerators and mattresses that create higher loads than the cleaner fingers are designed to withstand. When the high loads occur, the cleaner fingers can fail in a way that causes damage to the cleaner finger mounting bars, machine frames and lower powertrain components resulting in high repair costs.

Compactor cleaner teeth with two-piece construction have also been developed. For example, European Pat. Publ. No. EP 2 009 180 A1 to Werner published on Dec. 31, 2008, entitled "Cleaner Teeth Assembly for a Soil Compactor" discloses a cleaner teeth assembly having a beam at which several stripper teeth are arranged. The stripper teeth have a retaining part that is attached to the beam, and a wearing part that is detachably attached to the retaining part. The retaining part and the wearing part are attached to one another in a form fit manner, with a wedge-like lead of the retaining part being inserted into a recess of the wearing part. The retainer part and the wearing part are held together by a clamping pin inserted through aligned openings of the parts.

SUMMARY OF THE DISCLOSURE

In one aspect of the present disclosure, a cleaner finger assembly for cleaning compactor teeth on a compactor wheel of a compactor machine is disclosed. The compactor machine includes a compactor body and a plurality of compactor wheels. The cleaner finger assembly may include a cleaner finger base having a tip engaging surface and a base longitudinal axis, a cleaner finger tip having a base engaging surface and a tip longitudinal axis, and a finger tip anchoring mechanism attaching the cleaner finger tip to the cleaner finger base with the base engaging surface facing and engaging the tip engaging surface. The tip engaging surface, the base engaging surface and the finger tip anchoring mechanism are arranged so that the finger tip anchoring mechanism fails and the cleaner finger tip detaches from the cleaner finger base when the cleaner finger tip is engaged by debris on the compactor wheel with a force parallel to the tip longitudinal axis to cause one of a tip shear force greater than a tip anchor shear capacity and a tension force greater than a tip anchor tension capacity of the finger tip anchoring mechanism, and so that the finger tip anchoring mechanism fails and the cleaner finger tip detaches from the cleaner finger base when the cleaner finger tip is engaged by debris on the compactor wheel with a force perpendicular to the tip longitudinal axis to cause one of a tip shear force greater than the tip anchor shear capacity and a tension force greater than the tip anchor tension capacity of the finger tip anchoring mechanism.

In another aspect of the present disclosure, a compactor wheel cleaner assembly for cleaning compactor teeth on a compactor wheel of a compactor machine is disclosed. The compactor machine includes a compactor body and a plurality of compactor wheels. The compactor wheel cleaner assembly may include a cleaner assembly support arm mounted to the compactor body and extending across a compactor wheel outer surface of the compactor wheel, and a cleaner finger assembly mounted on the cleaner assembly support arm and positioned between adjacent rows of compactor teeth on the compactor wheel outer surface. The cleaner finger assembly may include a cleaner finger base having a tip engaging surface and a base longitudinal axis, a cleaner finger tip having a base engaging surface and a tip longitudinal axis, and a finger tip anchoring mechanism attaching the cleaner finger tip to the cleaner finger base with the base engaging surface facing and engaging the tip engaging surface. The tip engaging surface, the base engaging surface and the finger tip anchoring mechanism are arranged so that the finger tip anchoring mechanism fails and the cleaner finger tip detaches from the cleaner finger base when the cleaner finger tip is engaged by debris on the compactor wheel with a force parallel to the tip longitudinal axis to cause one of a tip shear force greater than a tip anchor shear capacity and a tension force greater than a tip anchor tension capacity of the finger tip anchoring mechanism, and so that the finger tip anchoring mechanism fails and the cleaner finger tip detaches from the cleaner finger base when the cleaner finger tip is engaged by debris on the compactor wheel with a force perpendicular to the tip longitudinal axis to cause one of a tip shear force greater than the tip anchor shear capacity and a tension force greater than the tip anchor tension capacity of the finger tip anchoring mechanism.

In a further aspect of the present disclosure, a cleaner finger assembly for cleaning compactor teeth on a compactor wheel of a compactor machine is disclosed. The compactor machine includes a compactor body, a plurality of compactor wheels, and a compactor wheel cleaner assembly with a cleaner assembly support arm disposed proximate a compactor wheel outer surface of the compactor wheel. The cleaner finger assembly may include a cleaner finger base having a tip engaging surface and a base longitudinal axis, a cleaner finger tip having a base engaging surface and a tip longitudinal axis, a plurality of tip anchor bolts attaching the cleaner finger tip to the cleaner finger base with the base engaging surface facing and engaging the tip engaging surface and the tip anchor bolts traversing a base-to-tip interface at which the tip engaging surface faces and engages the base engaging surface, wherein the tip anchor bolts have a tip anchor shear capacity and a tip anchor tension capacity, and a plurality of base anchor bolts attaching the cleaner finger base to the cleaner assembly support arm, wherein the base anchor bolts have a base anchor shear capacity is greater than the tip anchor shear capacity and a base anchor tension capacity that is greater than the tip anchor tension capacity. The tip engaging surface, the base engaging surface and the tip anchor bolts are arranged so that the tip anchor bolts fail and the cleaner finger tip detaches from the cleaner finger base, and the base anchor bolts retain the cleaner finger base attached to the cleaner assembly support arm, when the cleaner finger tip is engaged by debris on the compactor wheel with a force parallel to the tip longitudinal axis to cause one of a tip shear force greater than a tip anchor shear capacity and a tension force greater than a tip anchor tension capacity of the tip anchor bolts, and so that the tip anchor bolts fail and the cleaner finger tip detaches from the cleaner finger base, and the base anchor bolts retain the cleaner finger base attached to the cleaner assembly support arm, when the cleaner finger tip is engaged by debris on the compactor wheel with a force perpendicular to the tip longitudinal axis to cause one of a tip shear force greater than the tip anchor shear capacity and a tension force greater than the tip anchor tension capacity of the tip anchor bolts.

Additional aspects are defined by the claims of this patent.

DETAILED DESCRIPTION

Figure 1:
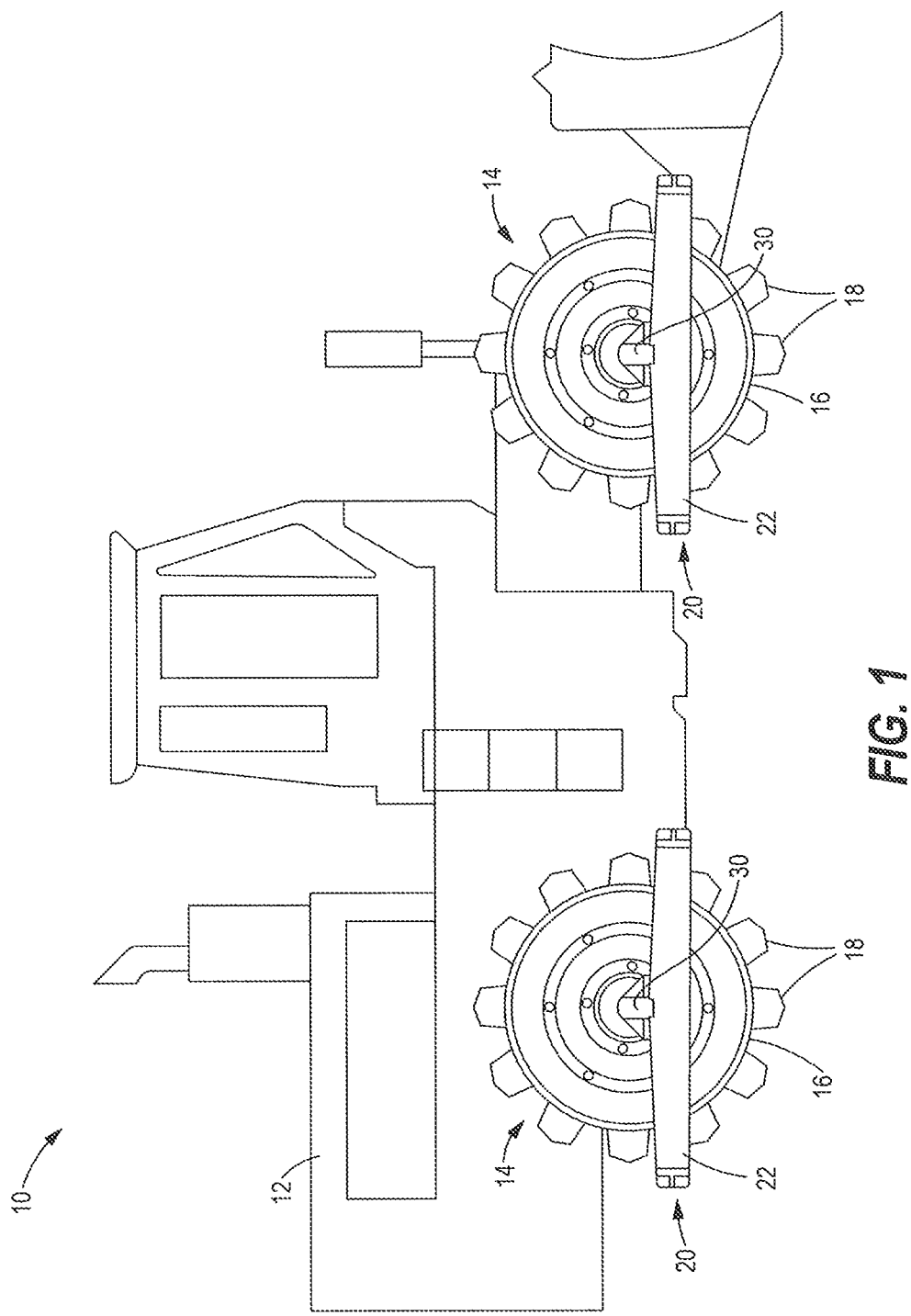
FIG. 1 is a side view of a landfill compactor machine in which cleaner finger assemblies in accordance with the present disclosure may be implemented.

Referring to FIG. 1, an example of a landfill compactor machine 10 in which compactor wheel cleaner assemblies and cleaner finger assemblies in accordance with the present disclosure may be implemented is illustrated. The compactor machine 10 includes a compactor body 12 having a plurality of compactor wheels 14 rotatably mounted thereto. One or more of the compactor wheels 14 is operatively coupled to a power source, such as an internal combustion engine (not shown), by a power transmission (not shown) to drive the compactor wheel(s) 14 and propel the compactor machine 10 over the surface of a landfill. Each of the compactor wheels 14 has a compactor wheel outer surface 16 on which a plurality of compactor teeth 18 are mounted to provide traction for the compactor machine 10 and compact the material in the landfill. The plurality of compactor teeth 18 are arranged circumferentially around the compactor wheel outer surfaces 16 of the compactor wheels 14 in a manner illustrated and described further hereinafter.

Figure 2:
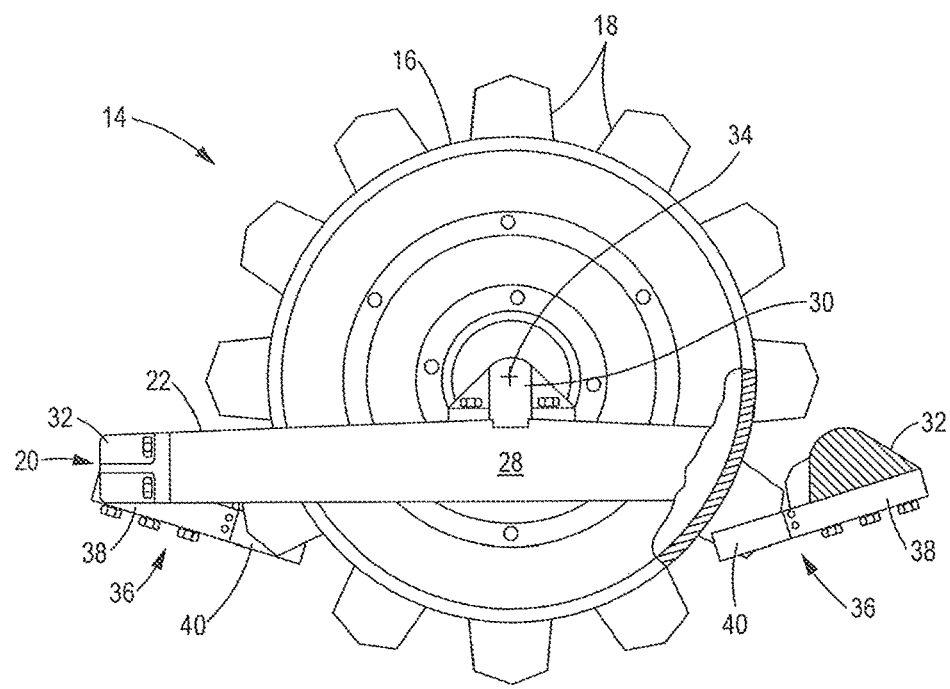
FIG. 2 is a side view of one of the compactor wheels of the landfill compactor machine of FIG. 1 with a portion of the compactor wheel and a cleaner finger support frame broken away to show a compactor wheel cleaner assembly in accordance with the present disclosure.
Figure 3:
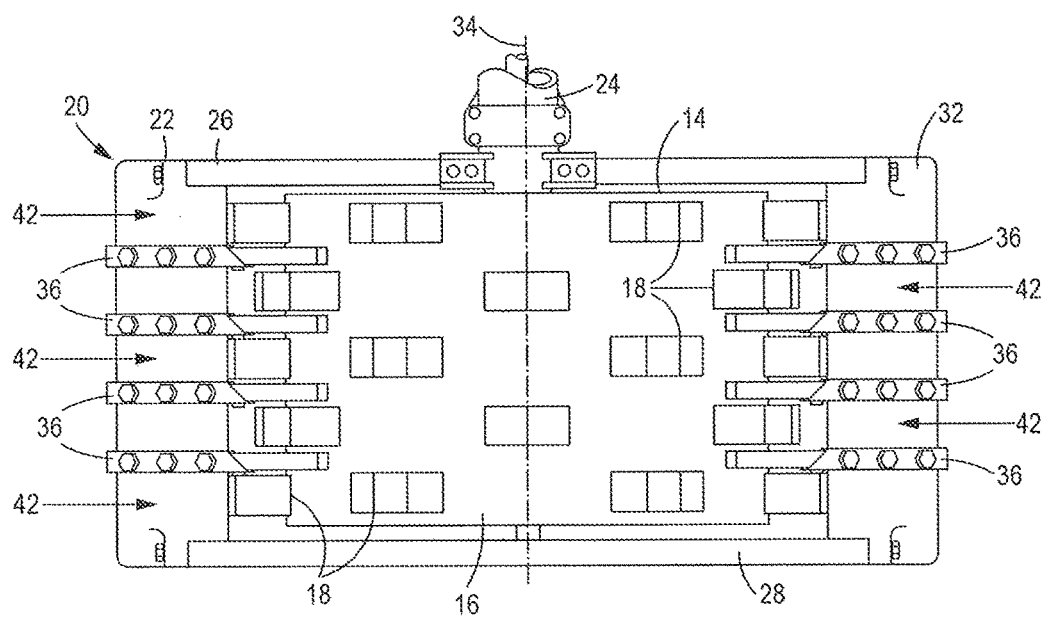
FIG. 3 is a bottom view of the compactor wheel and compactor wheel cleaner assembly of FIG. 2.

A compactor wheel cleaner assembly 20 may be mounted proximate each of the compactor wheels 14 by a cleaner assembly frame 22 mounted to the compactor body 12 and/or an axle 24 of the compactor wheel 14 as shown in FIGS. 1-3. Referring to FIGS. 2 and 3, the cleaner assembly frame 22 may include an inboard frame member 26 mounted about the axle 24 at an inboard side of the compactor wheel 14, an outboard frame member 28 mounted at an outboard side of the compactor wheel by a mounting bracket 30, and oppositely disposed cleaner assembly support arms 32 extending between the frame members 26, 28 on the front and rear sides of the compactor wheel 14. The cleaner assembly support arms 32 may extend approximately parallel to a wheel longitudinal axis 34 of the compactor wheel 14. A plurality of cleaner finger assemblies 36 are mounted on each of the cleaner assembly support arms 32 and longitudinally spaced across the compactor wheel outer surface 16. Each cleaner finger assembly 36 includes a cleaner finger base 38 mounted to the corresponding cleaner assembly support arm 32, and a cleaner finger tip 40 mounted to the cleaner finger base 38.

The cleaner assembly support arms 32 and the cleaner finger assemblies 36 are positioned so that the cleaner finger tips 40 are disposed proximate the compactor wheel outer surface 16 on either side of the compactor wheel 14. As best seen in FIG. 3, the compactor teeth 18 are arranged in a plurality of tooth rows 42 spaced longitudinally across the compactor wheel outer surface 16. The cleaner finger assemblies 36 are positioned between each pair of adjacent tooth rows 42 on either side of the compactor wheel 14. With this arrangement of elements, the cleaner finger tips 40 will scrape debris from between the compactor teeth 18 as the compactor wheel 14 rotates in either direction.

Figure 4:
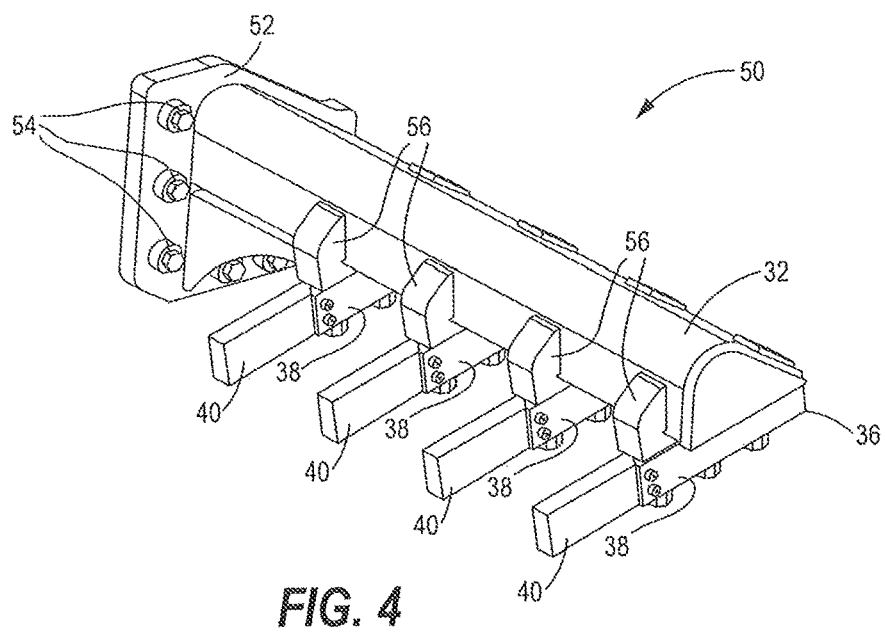
FIG. 4 is an isometric view of an alternative embodiment of a compactor wheel cleaner assembly in accordance with the present disclosure.

FIG. 4 illustrates an alternative embodiment of a compactor wheel cleaner assembly 50 that may be mounted directly to the compactor body 12 proximate one of the compactor wheels 14. The compactor wheel cleaner assembly 50 may include a cleaner assembly support arm 32 as described above and a body mounting bracket 52. The body mounting bracket 52 may be anchored to the compactor body 12 by a plurality of fasteners 54 to position the cleaner assembly support arm 32 proximate one side of the compactor wheel 14 with the cleaner finger tips 40 of the cleaner finger assemblies 36 positioned between adjacent tooth rows 42 as illustrated and discussed above. A plurality of gussets 56 extending from the cleaner assembly support arm 32 may provide additional support for the cleaner finger bases 38. An additional compactor wheel cleaner assembly 50 that is a mirror image of that shown in FIG. 4 may be mounted to the compactor body 12 on the opposite side of the compactor wheel 14 so that the compactor wheel 14 is cleaned by the cleaning finger assemblies 36 when it rotates in either direction.

Figure 5:
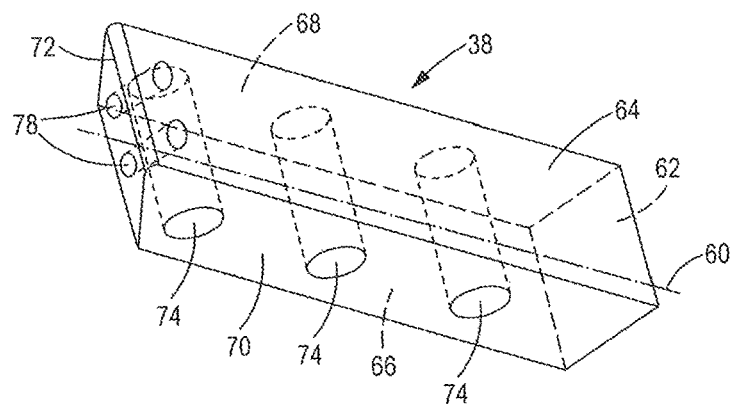
FIG. 5 is an isometric view of a cleaner finger base of a cleaner finger assembly in accordance with the present disclosure of the compactor wheel cleaner assembly of FIG. 4.
Figure 6:
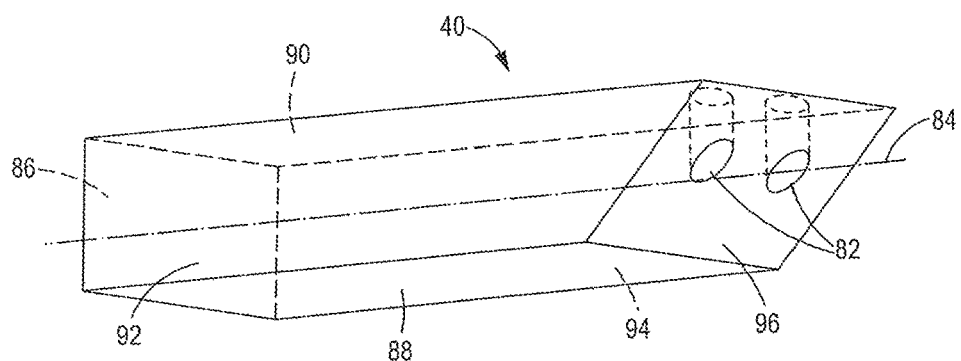
FIG. 6 is an isometric view of a cleaner finger tip of the cleaner finger assembly of the compactor wheel cleaner assembly of FIG. 4.

FIGS. 5 and 6 illustrate embodiments of the cleaner finger base 38 and the cleaner finger tip 40, respectively, of the cleaner finger assembly 36. Referring to FIG. 5, the cleaner finger base 38 may approximate the shape of a right prism and have a base longitudinal axis 60 in a lengthwise direction. A base end wall 62 and cross-sections taken perpendicular to the base longitudinal axis 60 may be generally rectangular. A first base side wall 64 and a second base side wall 66 may also be rectangular, but with the first base side wall 64 having a greater length in the longitudinal direction.

A base top wall 68 and a base bottom wall 70 are mirror image right trapezoids. Due to the shapes of the base walls 64-70, a tip interface wall opposite the base end wall 62 defines a tip engaging surface 72 that is not perpendicular to the base longitudinal axis 60. The orientation of the tip engaging surface 72 is discussed further below.

The cleaner finger base 38 will be connected to the cleaner assembly support arm 32 and the corresponding cleaner finger tip 40 by different attachment mechanisms. In the illustrated embodiment, a cleaner base anchoring mechanism includes a plurality of base anchor holes extending through the cleaner finger base 38 from the base top wall 68 to the base bottom wall 70. The base anchor holes 74 will receive base anchor bolts 76 (FIGS. 7 and 8) that will extend there through and be received by corresponding bolt holes in the cleaner assembly support arm 32 to anchor the cleaner finger base 38 thereto. A cleaner tip anchoring mechanism includes a plurality of tip anchor holes 78 extending through the cleaner finger base 38 from the first base side wall 64 to the tip engaging surface 72. The tip anchor holes 78 will receive tip anchor bolts 80 (FIGS. 7-9) that will extend there through and be received by corresponding tip mounting holes 82 (FIG. 6) of the cleaner finger tip 40 to anchor the cleaner finger tip 40 thereto.

Referring to FIG. 6, the cleaner finger tip 40 approximates the shape of a right prism that is complementary to the shape of the cleaner finger base 38, and has a tip longitudinal axis 84 in a lengthwise direction. A tip end wall 86 and cross-sections perpendicular to the tip longitudinal axis 84 are generally rectangular, as are a first tip side wall 88 and a second tip side wall 90 having a lengthwise dimension that is greater than the first tip side wall 88. A tip top wall 92 and a tip bottom wall 94 are mirror image right trapezoids, and a base interface wall having a base engaging surface 96 is not perpendicular to the tip longitudinal axis 84 due to the shapes of the tip walls 88-94. The tip mounting holes 82 extend through the cleaner finger tip 40 from the second tip side wall 90 to the base engaging surface 96.

Figure 7:
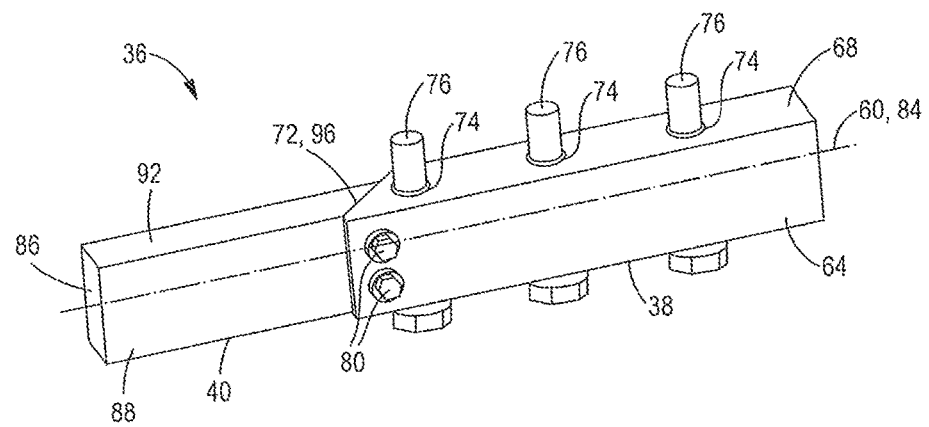
FIG. 7 is an isometric view of the cleaner finger assembly of the compactor wheel cleaner assembly of FIG. 4.
Figure 8:
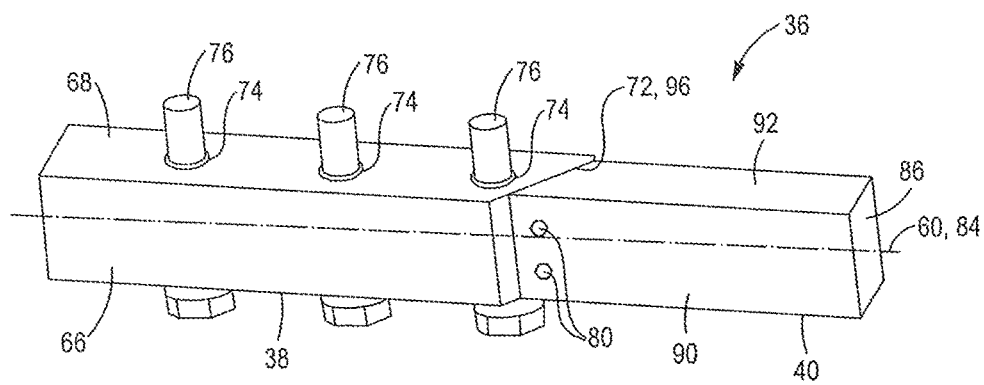
FIG. 8 is a second isometric view of the cleaner finger assembly of the compactor wheel cleaner assembly of FIG. 4.
Figure 9:
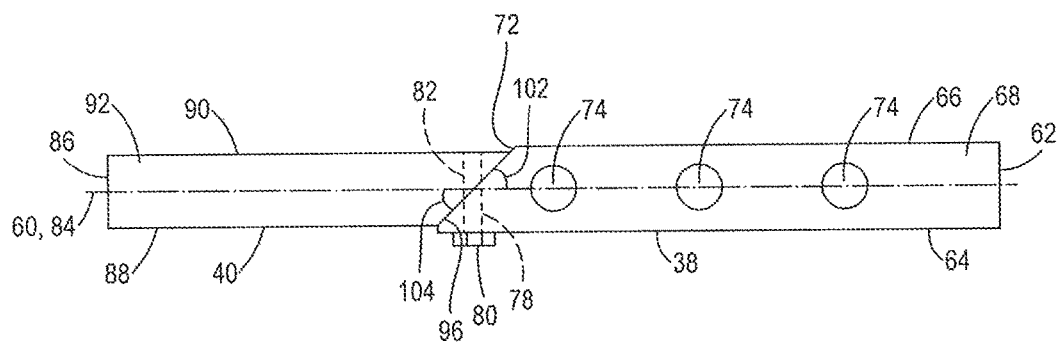
FIG. 9 is a top view of the cleaner finger assembly of the compactor wheel cleaner assembly of FIG. 4.

FIGS. 7-9 illustrate the cleaner finger assembly 36 of the present embodiment assembled and ready for installation on the cleaner assembly support arm 32. The base anchor bolts 76 are inserted through the base anchor holes 74 extend from the base top wall 68 for reception by corresponding holes in the cleaner assembly support arm 32. The cleaner finger tip 40 is mounted to the cleaner finger base 38 with the base engaging surface 96 facing and engaging the tip engaging surface 72 of the cleaner finger base 38. The tip anchor holes 78 and the tip mounting holes 82 are aligned, and the tip anchor bolts 80 are installed in the anchor holes 78, 82 to rigidly connect the cleaner finger tip 40 to the cleaner finger base 38.

As shown in the drawing figures, the cleaner finger base 38 and the cleaner finger tip 40 are substantially longitudinally aligned with the base longitudinal axis 60 and the tip longitudinal axis 84 being substantially aligned and coincident. The tip engaging surface 72 of the cleaner finger base 38 is oriented with respect to the base longitudinal axis 60 at a tip engaging surface angle 100. The base engaging surface 96 of the cleaner finger tip 40 is oriented with respect to the tip longitudinal axis 84 at a base engaging surface angle 102. In the illustrated embodiment, the engaging surface angles 100, 102 are approximately equal to 45° to longitudinally align the cleaner finger base 38 and the cleaner finger tip 40. In alternative embodiments, the engaging surface angles 100, 102 may have other values but still approximately equal so that the cleaner finger base 38 and the cleaner finger tip 40 are still oriented as shown in FIG. 7-9. In such embodiments, the engaging surface angles 100, 102 may have values within a range from 20° to 60°, for example, to allow the cleaner finger tip 40 to break away from the cleaner finger base 38 as described below.

Those skilled in the art will understand that the geometric configuration of the cleaner finger assembly 36 is illustrated and described herein is exemplary. One or both of the cleaner finger base 38 and the cleaner finger tip 40 may have shapes other than right prisms so long as the engaging surfaces 72, 96 are defined and function in the manner described herein to facilitate separation of the cleaner finger tip 40 from the cleaner finger base 38. The cleaner finger base 38 may have any shape necessary for attachment to the cleaner assembly support arm 32, and the cleaner finger tip 40 may have other shapes as necessary for effectively cleaning debris from the compactor wheel outer surface 16. In further alternative implementations, the cleaner finger base 38 and the cleaner finger tip 40 may have longitudinal axes 60, 84 that are not aligned and coincident when the cleaner finger assembly 36 is fully assembled if space requirements or obstructions caused by other components of an implementation of the cleaner finger assembly 36 is illustrated herein. Additional factors may be taken into consideration in designing the cleaner finger assembly 36, and alternative configurations are contemplated.

INDUSTRIAL APPLICABILITY

The cleaner finger assemblies 36 is illustrated and described herein are designed to fail in a way that minimizes damage to mounting bars, machine frames, lower powertrain components and other components of the compactor machine 10 while reducing maintenance costs for the machine owner. The compactor wheel cleaner assemblies 20, 50 in general, and the cleaner finger assembly 36 in particular, may be configured so that the cleaner finger tip 40 breaks away from the cleaner finger base 38 before the cleaner finger base 38 breaks away from the cleaner assembly support arm 32. In part, the desired failure mode is accomplished by utilizing relatively weaker elements in the finger tip anchoring mechanism than in the finger base anchoring mechanism. In one embodiment, the tip anchor bolts 80 are smaller and lower rated for resistance to shear forces and tension that may be caused by debris impacting the cleaner finger tip 40. In one implementation, the tip anchor bolts 80 may be medium strength M12 bolts while the base anchor bolts 76 may be high-strength and 24 bolts. As an example, the tip anchor bolts 80 may have ratings for a tip anchor shear capacity of 12.2 kN and a tip anchor tension capacity of 14.2 kN, while the base anchor bolts 76 may have ratings for a base anchor shear capacity of 51.1 kN and a base anchor tension capacity of 59.3 kN. Due to lower shear and tension capacities, the tip anchor bolts 80 will fail and the cleaner finger tip 40 will break away from the cleaner finger base 38 when greater than normal loads are applied, leaving the cleaner finger base 38 mounted to the cleaner assembly support arm 32 without damage to the cleaner assembly support arm 32 so that the cleaner finger tip 48 can be replaced at a lower cost relative to replacing the entire cleaner finger assembly 36.

The design of the engaging surface is 72, 96 further promotes failure of the tip anchor bolts 80 and detachment of the cleaner finger tip 40, and allow the cleaner finger tip 40 to detach regardless of an angle of impact of debris on the cleaner finger tip 40. As best shown in FIG. 9, the tip anchor bolts 80 traverse a base-to-tip interface between the tip engaging surface 72 and the base engaging surface 96. This arrangement places the tip anchor bolts 80 on a different plane than the interfacing engaging surfaces 72, 96. Impacts on the cleaner finger tip 40 will create shear forces, tension forces or a combination thereof on the tip anchor bolts 80 as the impact forces the engaging surfaces 72, 96 to move relative to each other. For example, an impact on the tip end wall 86 approximately parallel to the tip longitudinal axis 84 can cause shear forces in the tip anchor bolts 80 as the base engaging surface 96 tries to slide along the tip engaging surface 72. Impacts on the tip side walls 88, 90 approximately perpendicular to the longitudinal axes 60, 84 can create tension forces in the tip anchor bolts 80 as edges of the cleaner finger tip 40 can function as fulcrums such that the base engaging surface 96 is pulled away from the tip engaging surface 72. Impacts on the tip top wall 92 and on the tip bottom wall 94 can cause combinations of sheer forces and tension forces in the tip anchor bolts 80. With this arrangement, the finger tip anchoring mechanism, i.e. the tip anchor bolts 80, can fail due to impacts in any direction before the finger base anchoring mechanism fails.

Those skilled in the art will understand that the shape and orientation of the illustrated embodiment of the engaging surfaces 72, 96 is exemplary, and other arrangements are contemplated. For example, the planar engaging surfaces 72, 96 may be oriented at other angles relative to the longitudinal axes 60, 84. The engaging surfaces 72, 96 have any desired orientation relative to the longitudinal axes 60, 84 within a three-dimensional coordinate system. Such orientation choices may control the failure modes of the cleaner finger assembly 36, and control a direction at which a detached cleaner finger tip 40 will project to prevent the projecting cleaner finger tip 40 from causing damage to other components of the compactor machine 10. In further alternative embodiments, the engaging surfaces 72, 96 may be non-planar while still being complementary to facilitate attachment of the cleaner finger tip 40 to the cleaner finger base 38 and to achieve desired failure modes when the cleaner finger tip 40 is engaged by debris. For example, the tip engaging surface 72 may have a convex shape while the base engaging surface 96 has a complementary concave shape, or vice versa. Other nonplanar shapes are contemplated.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A cleaner finger assembly for cleaning compactor teeth on a compactor wheel of a compactor machine, the compactor machine having a compactor body and a plurality of compactor wheels, the cleaner finger assembly comprising:
   a cleaner finger base having a tip engaging surface and a base longitudinal axis;
   a cleaner finger tip having a base engaging surface and a tip longitudinal axis; and
   a finger tip anchoring mechanism attaching the cleaner finger tip to the cleaner finger base with the base engaging surface facing and engaging the tip engaging surface, wherein the tip engaging surface is not perpendicular to the base longitudinal axis and the base engaging surface is not perpendicular to the tip longitudinal axis, wherein the tip engaging surface is oriented relative to the base longitudinal axis by a tip engaging surface angle and the base engaging surface is oriented relative to the base longitudinal axis by a base engaging surface angle, and wherein the tip engaging surface angle and the base engaging surface angle have values within a range from 20° to 60°.

2. The cleaner finger assembly of claim 1, wherein the tip engaging surface is a first planar surface and the base engaging surface is a second planar surface.

3. The cleaner finger assembly of claim 1, wherein the tip engaging surface angle and the base engaging surface angle are approximately equal to 45°.

4. The cleaner finger assembly of claim 1, wherein the finger tip anchoring mechanism comprises a plurality of tip anchor bolts extending through the cleaner finger base and the cleaner finger tip and traversing a base-to-tip interface at which the tip engaging surface faces and engages the base engaging surface.

5. The cleaner finger assembly of claim 1, comprising a finger base anchoring mechanism attaching the cleaner finger base to a cleaner assembly, support arm operatively connected to the compactor body.

6. A compactor wheel cleaner assembly for cleaning compactor teeth on a compactor wheel of a compactor machine, the compactor machine having a compactor body and a plurality of compactor wheels, the compactor wheel cleaner assembly comprising:
   a cleaner assembly support arm mounted to the compactor body and extending across a compactor wheel outer surface of the compactor wheel; and
   a cleaner finger assembly mounted on the cleaner assembly support arm and positioned between adjacent rows of compactor teeth on the compactor wheel outer surface, the cleaner finger assembly comprising:
   a cleaner finger base having a tip engaging surface and a base longitudinal axis;
   a cleaner finger tip having a base engaging surface and a tip longitudinal axis;
   a finger tip anchoring mechanism attaching the cleaner finger tip to the cleaner finger base with the base engaging surface facing and engaging the tip engaging surface; and
   a finger base anchoring mechanism attaching the cleaner finger base to the cleaner assembly support arm, the finger tip anchoring mechanism being weaker than the finger base anchoring mechanism so that the cleaner finger breaks away from the cleaner finger base and the cleaner finger base remains attached to the cleaner assembly support arm when the cleaner finger tip is impacted by debris on the compactor wheel with a force greater than a threshold force.

7. The compactor wheel cleaner assembly of claim 6, wherein the tip engaging surface is a first planar surface and the base engaging surface is a second planar surface.

8. The compactor wheel assembly of claim 6, Wherein the tip engaging surface is not perpendicular to the base longitudinal axis and the base engaging surface is not perpendicular to the tip longitudinal axis.

9. The compactor wheel cleaner assembly of claim 8, wherein the tip engaging surface is oriented relative to the base longitudinal axis by a tip engaging surface angle and the base engaging surface is oriented relative to the base longitudinal axis by a base engaging surface angle, and wherein the tip engaging surface angle and the base engaging surface angle have values within a range from 20° to 60°.

10. The compactor wheel cleaner assembly of claim 9, wherein the tip engaging surface angle and the base engaging surface angle are approximately equal to 45°.

11. The compactor wheel cleaner assembly of claim 6, wherein the finger tip anchoring mechanism comprises a plurality of tip anchor bolts extending through the cleaner finger base and the cleaner finger tip and traversing a base-to-tip interface at which the tip engaging surface faces and engages the base engaging surface.

12. The compactor wheel cleaner assembly of claim 6, comprising a plurality of cleaner finger assemblies mounted on the cleaner assembly support arm, with each of the plurality of cleaner finger assemblies positioned between different adjacent rows of compactor teeth on the compactor wheel outer surface.

13. A cleaner finger assembly for cleaning compactor teeth on a compactor wheel of a compactor machine, the compactor machine having a compactor body, a plurality of compactor wheels, and a compactor wheel cleaner assembly with a cleaner assembly support arm disposed proximate a compactor wheel outer surface of the compactor wheel, the cleaner finger assembly comprising:

a cleaner finger base having a tip engaging surface and a base longitudinal axis;
a cleaner finger tip having a base engaging surface and a tip longitudinal axis;
a plurality of tip anchor bolts attaching the cleaner finger tip to the cleaner finger base with the base engaging surface facing and engaging the tip engaging surface and the tip anchor bolts traversing a base-to-tip interface at which the tip engaging surface faces and engages the base engaging surface; and
a plurality of base anchor bolts attaching the cleaner finger base to the cleaner assembly support arm, the tip anchor bolts being weaker than the base anchor bolts so that the cleaner finger tip breaks away from the cleaner finger base and the cleaner finger base remains attached to the cleaner assembly support arm when the cleaner finger tip is impacted b r debris on the compactor wheel with a three greater than a threshold force.

14. The cleaner finger assembly of claim 13, wherein the tip engaging surface is a first planar surface and the base engaging surface is a second planar surface.

15. The cleaner finger assembly of claim 13, wherein the tip engaging surface is not perpendicular to the base longitudinal axis and the base engaging surface is not perpendicular to the tip longitudinal axis.

16. The cleaner finger assembly of claim 15, wherein the tip engaging surface is oriented relative to the base longitudinal axis by a tip engaging surface angle and the base engaging surface is oriented relative to the base longitudinal axis by a base engaging surface angle, and wherein the tip engaging surface angle and the base engaging surface angle have values within a range from 20° to 60°.

17. The cleaner finger assembly of claim 16, wherein the tip engaging surface angle and the base engaging surface angle are approximately equal to 45°.

\* \* \* \* \*